(12) United States Patent
Boyl-Davis et al.

(10) Patent No.: US 7,216,408 B2
(45) Date of Patent: May 15, 2007

(54) FLEXIBLE RAIL MULTIAXIS MACHINE TOOL AND METHOD

(75) Inventors: Theodore M. Boyl-Davis, Snohomish, WA (US); James N. Buttrick, Jr., Seattle, WA (US); Roger A. Gage, Marysville, WA (US); Darrell D. Jones, Mill Creek, WA (US); David P. Banks, Lake Stevens, WA (US); Ronald Wayne Outous, Shoreline, WA (US); Paul Reuben Arntson, Bothell, WA (US); James C. Murphy, Kirkland, WA (US); Alan R. Merkley, Greenbank, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/854,210

(22) Filed: May 27, 2004

(65) Prior Publication Data

US 2005/0265798 A1    Dec. 1, 2005

(51) Int. Cl.
*B21D 39/03* (2006.01)
*B23P 23/04* (2006.01)

(52) U.S. Cl. .................... 29/33 R; 409/178; 408/76; 408/98

(58) Field of Classification Search ............... 29/33 R; 409/178, 179; 105/29.1, 144; 408/76, 98
See application file for complete search history.

(56) References Cited

U.S. PATENT DOCUMENTS

| | | | | |
|---|---|---|---|---|
| 3,575,364 A * | 4/1971 | Frederick | ............ | 266/56 |
| 3,599,958 A * | 8/1971 | Schindler | ............ | 269/48.1 |
| 3,935,985 A * | 2/1976 | Prudhomme et al. | ... | 228/45 |
| 4,297,061 A * | 10/1981 | Wolfe et al. | ......... | 409/131 |
| 4,382,728 A * | 5/1983 | Anderson et al. | ...... | 409/137 |
| 4,422,384 A * | 12/1983 | Johnson et al. | ........ | 105/29.1 |
| 4,599,018 A * | 7/1986 | Woods | .................. | 408/1 R |
| 4,850,763 A | 7/1989 | Jack et al. | ............ | 409/178 |
| 4,947,910 A * | 8/1990 | Reneau | ................ | 144/371 |
| 5,323,962 A | 6/1994 | Jassby et al. | .......... | 238/10 R |
| 5,562,043 A | 10/1996 | Gromes | ................ | 105/29.1 |
| 5,697,413 A * | 12/1997 | Fuller | .................. | 144/356 |
| 6,158,666 A * | 12/2000 | Banks et al. | .......... | 238/10 R |
| 6,467,385 B1 | 10/2002 | Buttrick et al. | .......... | 83/745 |
| 6,494,307 B1 | 12/2002 | Kozak et al. | .......... | 198/465.1 |
| 6,843,328 B2 * | 1/2005 | Boyl-Davis et al. | ...... | 173/32 |
| 6,926,094 B2 * | 8/2005 | Arntson et al. | .......... | 173/32 |
| 6,966,731 B2 * | 11/2005 | VanderPol et al. | ...... | 409/179 |

(Continued)

FOREIGN PATENT DOCUMENTS

FR    2673133    8/1992

*Primary Examiner*—Monica Carter
*Assistant Examiner*—Eric A. Gates
(74) *Attorney, Agent, or Firm*—Baker & Hostetler, LLP

(57) ABSTRACT

A flexible rail machine tool couples temporarily to a structure by vacuum cups and positions a tool head at any desired point over an area. The toolhead can perform operations such as drilling, bolt insertion, and acquisition of dimension data. The flexible rail can conform to surface curvature in one or more axes. Tool head perpendicularity to the structure can be sensed and adjusted as needed. The as-attached position of the rail may be compensated for through coordinate transformation, allowing holes, for example, to be placed with substantial precision.

25 Claims, 9 Drawing Sheets

U.S. PATENT DOCUMENTS

2002/0168241 A1* 11/2002 David et al. ................. 409/178
2003/0116331 A1   6/2003 Boyl-Davis et al. ........... 173/1
2004/0265077 A1* 12/2004 Boyl-Davis et al. ........ 408/1 R
2004/0265078 A1* 12/2004 Boyl-Davis et al. ........ 408/1 R
2004/0265081 A1* 12/2004 Buttrick, Jr. ................. 408/76

* cited by examiner

FLEXIBLE RAIL MULTIAXIS MACHINE TOOL AND METHOD

FIELD OF THE INVENTION

The present invention relates generally to manufacturing tools and automation. More particularly, the present invention relates to rail-mounted machine tools and automated positioning systems.

BACKGROUND OF THE INVENTION

Classic aircraft production has, since early in the history of hard-skinned aerostructures, involved making templates and aligning them on fuselage and flight surface skins, then drilling through holes in the templates using hand-held drills to prepare the aerostructure for installation of rivets and screws. Placement of holes in the structure has thus generally been limited to human speeds, and has required extensive inspection.

In theory, a massive robotic apparatus could be developed that could autonomously place holes at any location on a workpiece such as an aerostructure, with the robotic apparatus placed, for example, on a monument base separated from the workpiece, and with each hole drilled with accuracy limited by the position sensors in the robotic apparatus. Such apparatus, however, has not been developed or shown to be economically feasible for general use. However, it has been demonstrated that a manufacturing apparatus with some degree of automation, attached directly to a portion of a workpiece under construction, can be practical, where desirable criteria of practicality include accuracy, adaptability, speed, low manufacturing cost, and light weight and compact size for ease of positioning,.

For generally flat and/or straight surfaces, which can occur, in a limited number of cases, along the longitudinal axis of a fuselage, a variety of robotic tools can be effective. For example, in an early version, a substantially rigid rail was temporarily attached to a workpiece using common fasteners such as screws. A drill could be moved along the rail, by hand or using a motorized positioner, to successive locations adjacent to the rail, at which locations the drill could be caused to drill a clean, straight hole. The drill could then be advanced until all of the needed holes along that straight line had been drilled.

The process and apparatus described above has strengths, namely that a series of holes can be drilled with quite good precision and decent speed, but also has several drawbacks. For example, there must first be correctly located mounting holes to which to attach the rail. Further, installation and removal of the rail may easily mar the workpiece. Also, alignment is critical and may be time-consuming. As well, only a small percentage of needed holes are likely to fall on any one line, so devising the drilling patterns, preparing mounting holes, and repeatedly repositioning the rail can be tedious. In addition, as noted, a rigid rail cannot traverse curves, so the above-described tool could not be positioned circumferentially on fuselages, for example, or typically in any direction other than spanwise on wings.

An additional drawback, not only to the apparatus described above but to other apparatus in existence, involves limited excursion range for a drilling component of the apparatus. Typical tools may use two rails to provide a secure base, then translate a toolhead across a workpiece. Even if the toolhead can move between the rails as well as along the rails, no work can be performed outside an excursion envelope established by the two rails.

Accordingly, it is desirable to provide a flexible rail machine tool method and apparatus that conforms to a workpiece surface that may have significant curvature, which flexible rail machine tool can drill holes within a work zone on the workpiece. It is further desirable that such a tool be able to traverse a surface along at lease one axis without manual repositioning and to drill holes normal to a surface substantially without manual intervention. It is further desirable that such a tool be able to drill holes outside the excursion envelope defined by the rail system attachment footprint. It is further desirable that such a tool be able to translate desired hole locations from a reference coordinate system to an as-affixed coordinate system. It is further desirable that such a tool be readily mounted and demounted from the workpiece.

SUMMARY OF THE INVENTION

The foregoing needs are met, to a great extent, by the present invention, wherein, in one embodiment, a flexible rail machine tool method and apparatus is provided that is able to conform to a workpiece surface that has significant curvature and is able to perform machining operations such as drilling holes within a work zone on the workpiece. In another aspect, the flexible rail machine tool method and apparatus is further able to traverse a surface along at lease one axis without manual repositioning and is able to perform machining operations such as drilling holes normal to a surface. In yet another aspect, the flexible rail machine tool method and apparatus is further able to perform machining operations such as drilling holes outside the boundaries of its attachment device. In still another aspect, the flexible rail machine tool method and apparatus is further able to translate desired hole locations from a reference coordinate system to an as-installed coordinate system. In another aspect, the flexible rail machine tool method and apparatus can be readily mounted and demounted from the workpiece.

In accordance with one embodiment of the present invention, a flexible rail machine tool for performing operations on a workpiece comprises a primary rail coupled to the workpiece, a toolhead, an end effector on the toolhead, wherein the end effector is a mechanism that performs a machine tool function, and a first support mechanism attaching and supporting the toolhead with respect to the primary rail, wherein the first support mechanism is situated between a first maximum lateral extent of the toolhead and a second maximum lateral extent of the toolhead.

In accordance with another embodiment of the present invention, a flexible rail machine tool for performing operations on a workpiece comprises means for removably coupling a primary rail to the workpiece, means for performing cutting, holding, measuring, heating, and other processing on the workpiece, and means for positioning the means for performing processing with respect to the workpiece.

In accordance with yet another embodiment of the present invention, a method for performing machine-tool operations upon a workpiece comprises the steps of positioning a primary rail with respect to the workpiece, spacing the primary rail at a uniform distance with respect to the workpiece, removably coupling the primary rail to the workpiece, fixing a machining tool with respect to the primary rail, and performing cutting, holding, measuring, heating, and other processes on the workpiece using the machining tool.

There have thus been outlined, rather broadly, certain embodiments of the invention, in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
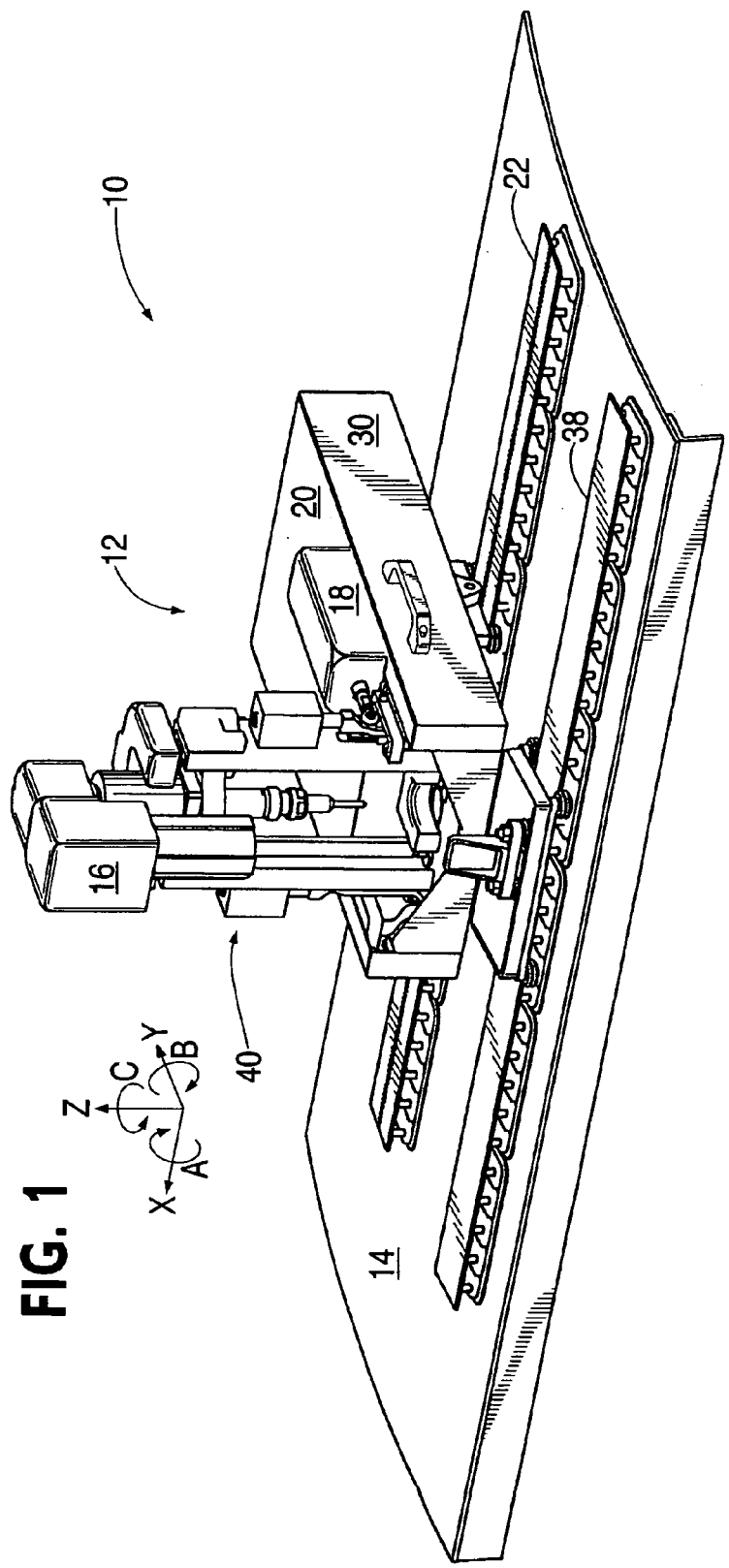
FIG. 1 is a first perspective view illustrating a flexible rail machine tool according to a preferred embodiment of the invention configured for drilling between the rails, with external covers shown in place.

An embodiment in accordance with the present invention provides a rail system for positioning a toolhead above a workpiece that may have significant curvature in one or more axes. Smooth motion of the toolhead on a rail suspension system is achieved in the exemplary embodiment through use of a main rail system comprising one or more relatively long and wide, flat, flexible rails with vee-shaped rail edge faces contacted by mating bearing devices, such as rollers, on the toolhead. Motorized drive of the toolhead along a rail system axis parallel to the rail edge faces—hereinafter the longitudinal axis—in the exemplary embodiment is achieved using a pinion gear on the toolhead and a rack formed into the primary rail.

The toolhead may be capable of self-driven motion along and about multiple axes. In addition to having rollers and a motor drive to permit traversing the longitudinal extent of the main rails, the toolhead may be equipped with cross rails, which may preferably be configured at right angles to the main rails, and for which a motor drive that may be separate from the longitudinal motor drive may permit autonomous transverse positioning. In addition, motorized rotation of a chuck or mandrel for machining is a preferable capability. Similarly, a toolhead with a machine tool such as a drill is generally required to plunge the tool into and out of the workpiece using another motor drive. Further, tilting the toolhead to adjust the angle of penetration with respect to the toolhead may be desirable, and may call for yet another motor drive. Additional desirable capabilities may include replacement of one type of machine tool with another, or addition of multiple tools and accessory devices for measuring position, inserting and steadying fastenings from a dispenser into a hole previously prepared, or a variety of other useful operations.

For the purposes of this disclosure, the term "end effector" is used as a term of summary, incorporating, for example, "drill" as well as "grinder," "inserter," "measuring probe," and any other suitable functions for which a flexible rail machine tool may be employed.

For the purposes of this disclosure, translation along the longitudinal axis of the main rails is also termed X-axis motion. Transverse motion with respect to the main rails, still substantially parallel to the mean surface of the workpiece, is termed Y-axis motion. Stroke motion of the end effector penetrating the workpiece is termed Z-axis motion. Tilting the end effector with respect to the toolhead X-axis, so that the end effector enters the workpiece at an angle with respect to the toolhead, is termed A-axis motion. The exemplary embodiment does not feature tilt of the end effector about the Y-axis, which would be B-axis motion. End effector spindle rotation about the Z-axis is termed C-axis motion. In addition to these motions, there is provision for applying a pressure preload to the workpiece. Also, there is provision for a compensator to make fine adjustments to the orientation of the entire toolhead about the A-axis.

Attachment of the primary rail to the workpiece preferably uses vacuum cups with spacing pins. The described rail, which is relatively long, wide, and thin, may be relatively rigid with respect to lateral flexure while allowing bending and twisting to conform to the workpiece. General conformance to contours of the workpiece can be realized with a multiplicity of rigid spacing pins, preferably of uniform height, attached to the rail and drawn against the workpiece. Such height uniformity may promote consistent rail-to-workpiece spacing, which in turn may maximize X-axis positioning accuracy. The holding force can come from any of a variety of sources, one of which is vacuum from an external vacuum source fed to a resilient cup surrounding each spacing pin or group of spacing pins. The use of a sufficiently large total vacuum cup surface area can permit the flexible rail machine tool to be attached to a workpiece at effectively any orientation.

The toolhead may include automated position detection for one or more of its motions, so that the location of a tool with respect to the workpiece may be known with good precision. This capability may be extended to include computational correction of position, so that, for example, a detector on a toolhead can identify reference positions on a workpiece and deliver them to a processor that can calibrate its positioning commands to the toolhead, effectively performing coordinate transformation and automatically drilling holes where desired irrespective of initial rail placement uncertainty.

Preferred embodiments of the invention will now be further described with reference to the drawing figures, in which like reference numerals refer to like parts throughout.

FIG. 1 is an overall perspective view of a flexible rail machine tool 10 comprising a toolhead 12 and resting on a primary rail 22 and a second rail 38 coupling the toolhead 12 to a workpiece 14.

Figure 2:
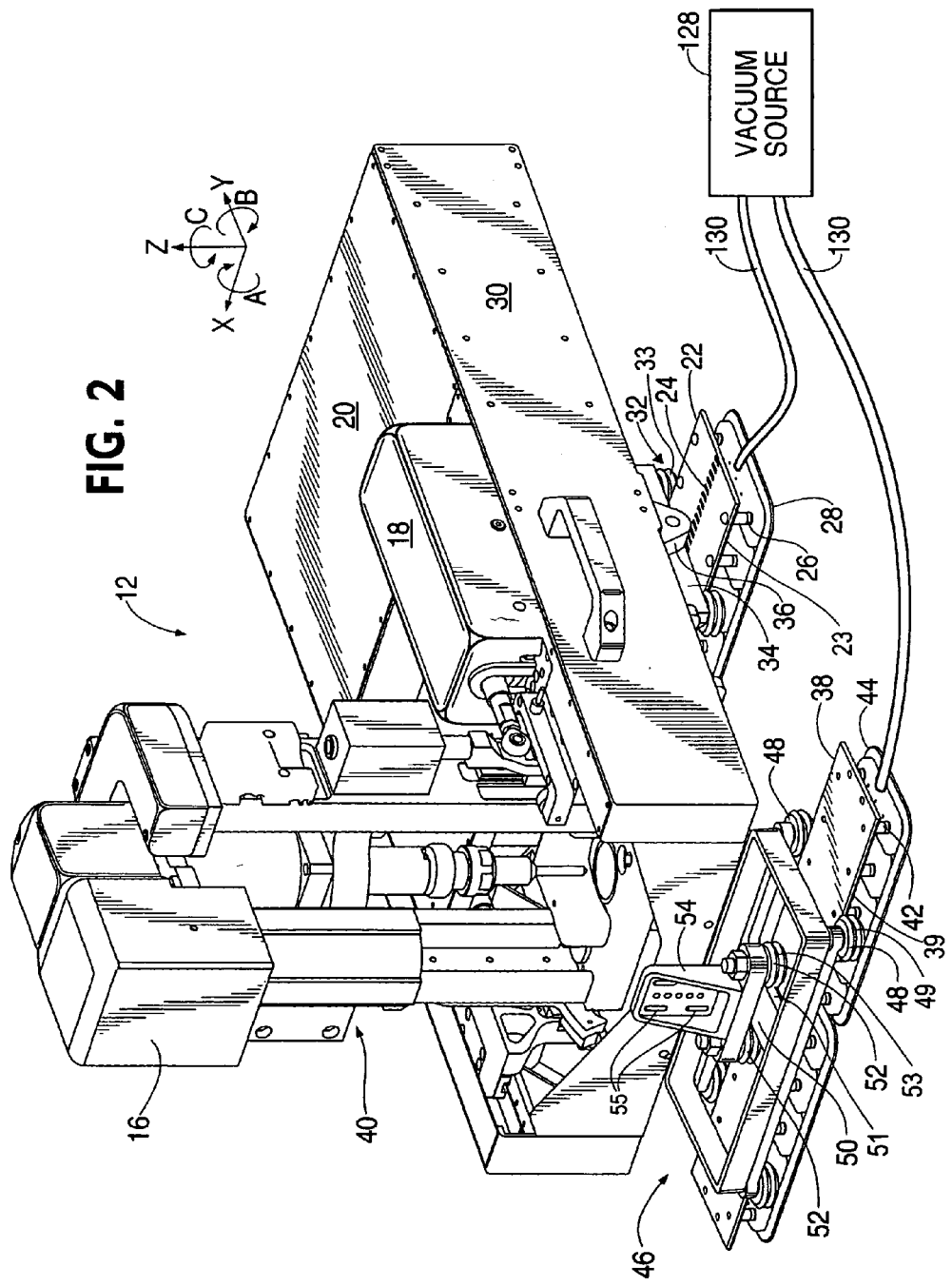
FIG. 2 is a closer view of the flexible rail machine tool of FIG. 1.

FIG. 2 is an enlarged view of the flexible rail machine tool 10 of FIG. 1, further detailing the toolhead 12 and showing the toolhead 12 riding on short segments of the two rails 22 and 38. It may be observed that the apparatus of FIG. 2 is shown with multiple covers (including those identified as 16, 18, and 20) installed. The primary rail 22, located near the center of the toolhead 12, is incised with a gear tooth rack 24, and is fitted beneath with spacing pins 26 and vacuum cups 28. The first side frame member 30 provides structural integration for the toolhead 12. Also visible are vee rollers 32, a first primary rail roller support arm 34, and a first primary rail pivot 36. Vee rollers 32 include a circumferential female vee groove 33 that bears against a male vee groove 23 along the edge of the primary rail 22.

In the foreground of FIG. 2 is a second rail 38, which is herein termed a spanned rail, since the placement of the two rails in this configuration spans the reach of the end effector 40. The spanned rail 38 is, like the center rail 22, equipped with spacing pins 42 and vacuum cups 44, of which vacuum cups 44 two are shown in part in FIG. 1. A vacuum source 128 is shown schematically, connected by hoses 130 to vacuum cups 28 and 44 to provide attachment force. The spanned rail support mechanism 46 for the spanned rail 38 is shown, comprising spanned rail vee rollers 48 to provide direct support to the spanned rail 38, a short transverse rail 50 joining the spanned rail vee rollers 48, spanned transverse vee rollers 52 that allow the toolhead 12 to move independently of the spanned rail 38, and a spanned support bracket 54 to affix the spanned rail support mechanism 46 to the toolhead 12. The spanned rail vee rollers 48 include a circumferential female vee groove 49 that bears against a male vee groove 39 along the edge of the spanned rail 38. and the spanned transverse vee rollers 52 include a circumferential female vee groove 53 that bears against a male vee groove 51 along the edge of the transverse rail 50.

The direct coupling of the primary rail 22 to the toolhead 12 allows free rotation of the toolhead 12 about the A-axis only. The looser coupling of the second rail 38 allows the toolhead 12 to float laterally (in the Y-axis direction) with respect to the second rail 38, as well as having A-axis rotation and unencumbered X-axis motion. This permits the primary rail 22 to serve as a reference, while the second rail 38 provides stability and support. The second rail 38 is thus permitted to follow a non-parallel path over a complexly curved workpiece 14 without causing binding of the coupling apparatus.

The coupling mechanism for the second rail—which, in the exemplary embodiment, is the spanned support bracket 54 shown—has mounting slots 55. Bolts through such slots 55 can permit adjustments to be made to the stance of the toolhead 12. Should it be desired to make such stance adjustments dynamically, such as under computer control during operations, a motorized, sensor-equipped actuator can be interposed between the spanned support bracket 54 and the toolhead 12.

Figure 3:
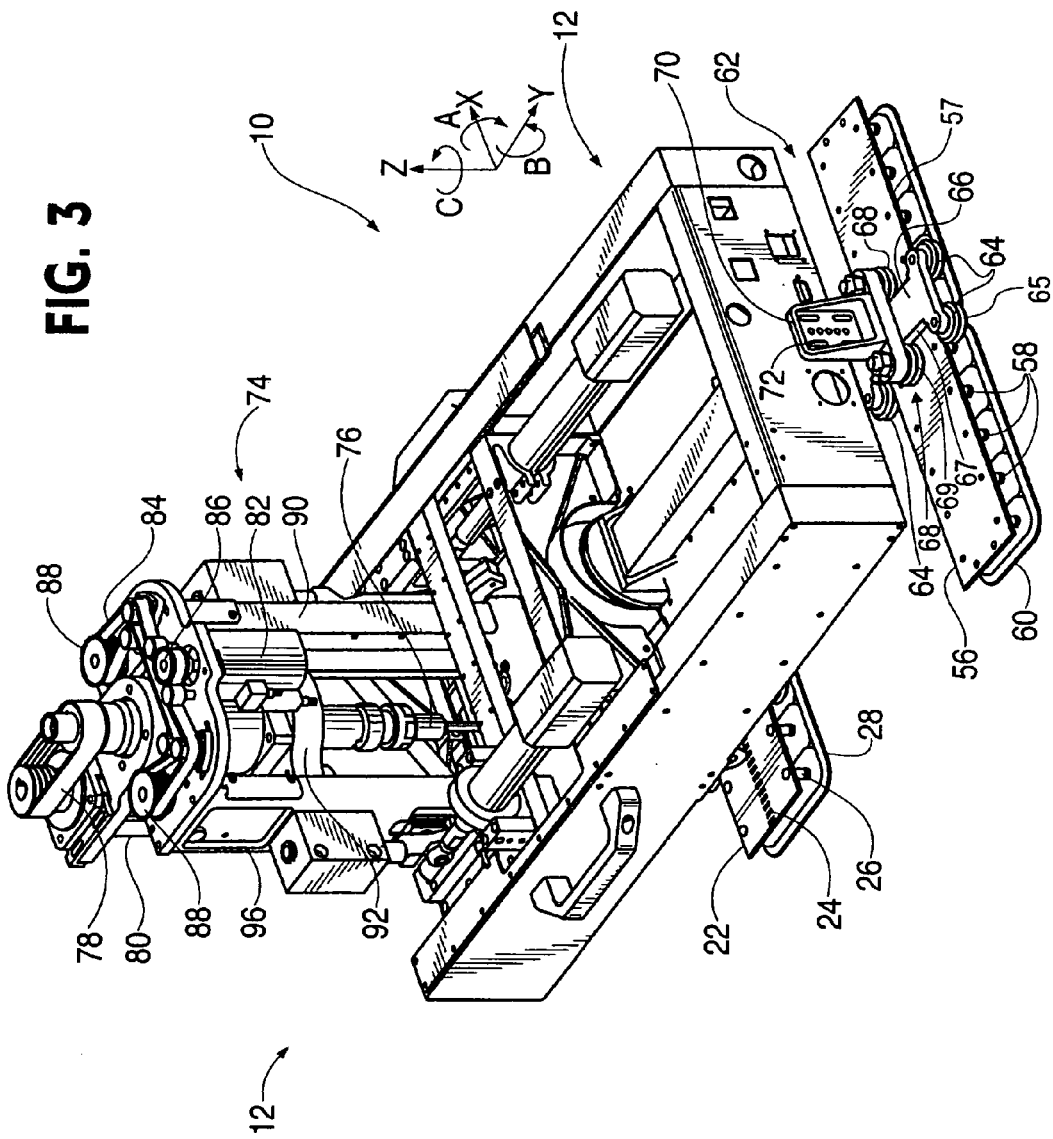
FIG. 3 is a second perspective view of the flexible rail machine tool according FIG. 1 configured for cantilever machining, with several covers shown removed.

FIG. 3 is a third perspective view of the flexible rail machine tool 10 with some covers (16, 18, and 20 of FIG. 2) omitted, in which view the spanned rail 38 has been removed and a cantilever rail 56 has been added, equipped with spacing pins 58 and vacuum cups 60, and attached to the toolhead 12 using a cantilever rail support mechanism 62 comprising cantilever rail vee rollers 64 to provide direct support to the cantilever rail 56, a short transverse rail 66 joining the cantilever rail vee rollers 64, cantilever transverse vee rollers 68 that allow the toolhead 12 to move independently of the cantilever rail 56, and a coupling mechanism—in this exemplary embodiment, a cantilever support bracket 70—to affix the cantilever rail support mechanism 62 to the toolhead 12. The cantilever rail vee rollers 64 include a circumferential female vee groove 65 that bears against a male vee groove 57 along the edge of the cantilever rail 56, and the cantilever transverse vee rollers 68 include a circumferential female vee groove 69 that bears against a male vee groove 67 along the edge of the transverse rail 66.

As in the spanned configuration, the cantilever support bracket 70 shown has mounting slots 72. Adjustment of bolts through such slots 72 can permit adjustments to be made to the stance of the toolhead 12. If it should be desired to make such stance adjustments dynamically, such as under computer control during operations, a motorized, sensor-equipped actuator can be interposed between the cantilever support bracket 70 and the toolhead 12.

Switching from spanned to cantilever configuration can permit the end effector 40 to operate near a workpiece edge or in a region of excessive curvature or weaker underlying structural support, thereby extending the capability of the flexible rail machine tool 10. It will be observed that the attachment hardware for the two configurations may differ, so that conversion from one to the other configuration may require different components in some embodiments, although use of the same components for both may be preferable in other embodiments.

FIG. 3 shows additional features of the flexible rail machine tool 10. The end effector spindle 76 may in some embodiments be powered (C-axis motion) using belt feed 78 from a motor 80. Advance of the end effector spindle 76 (Z-axis motion) is shown driven by a rotary actuator 82 using a toothed belt 84 from a toothed drive pulley 86 to a pair of toothed driven pulleys 88, applying torque to drive screws and drive nuts (enclosed within uprights 90), and raising and lowering a transverse spindle support arm 92.

FIGS. 4–7 show both the spanned rail 38 and the cantilever rail 56 for reference. Although typical embodiments may use one or the other, use of both may be preferable for some embodiments.

Figure 4:
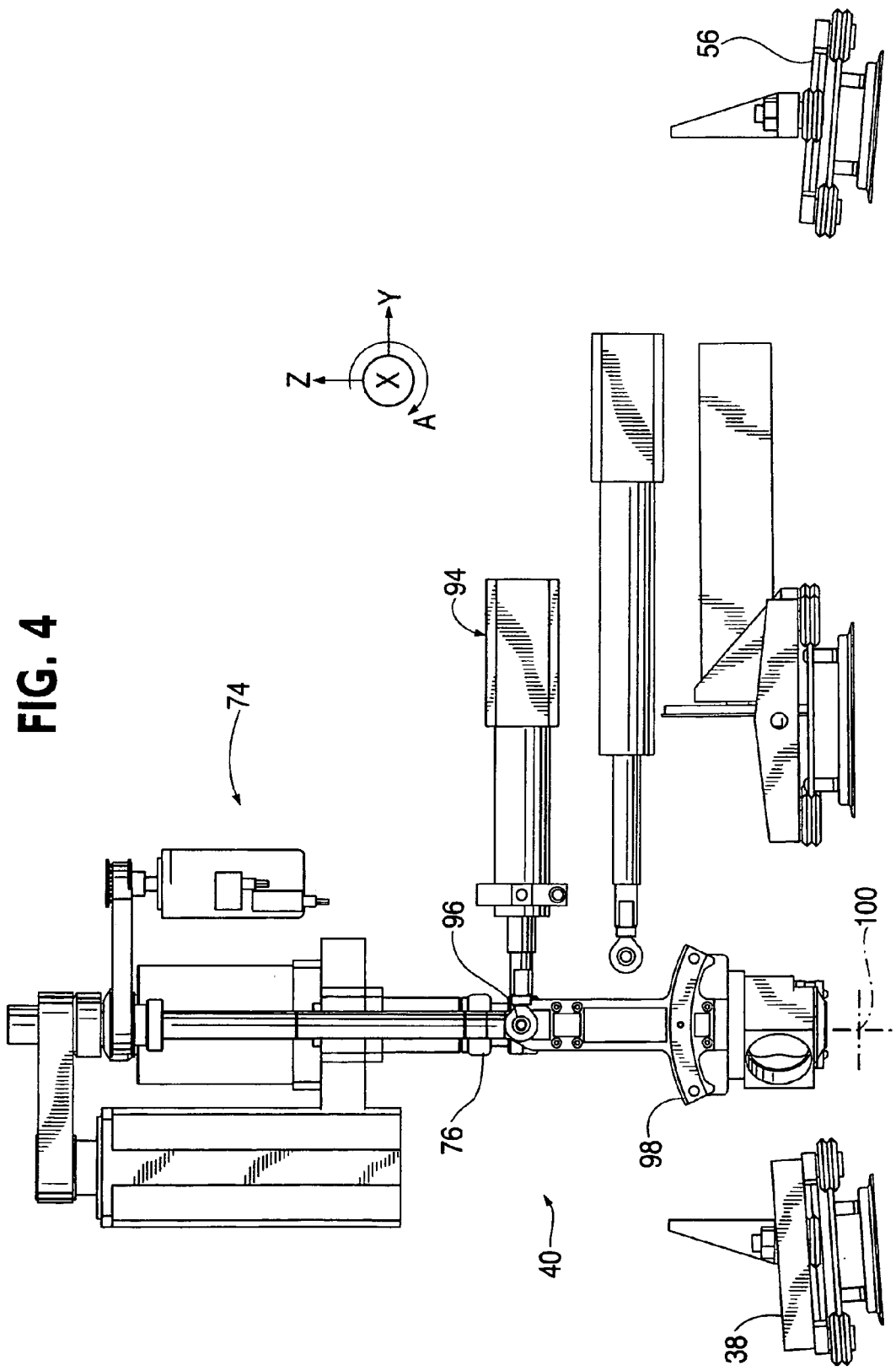
FIG. 4 is a side view of the flexible rail machine tool, with several covers, the frame, and some additional hardware elements omitted, but showing all three rails.

FIG. 4 is a side view showing the above features and the mechanism for tilt of the drive spindle 76 (A-axis motion). Tilt can be realized using a tilt actuator 94, which is connected by a spherical bearing 96 to the end effector 40. An arced rail 98 allows the spindle 76 to pivot substantially about the point of contact 100 with the workpiece.

Figure 5:
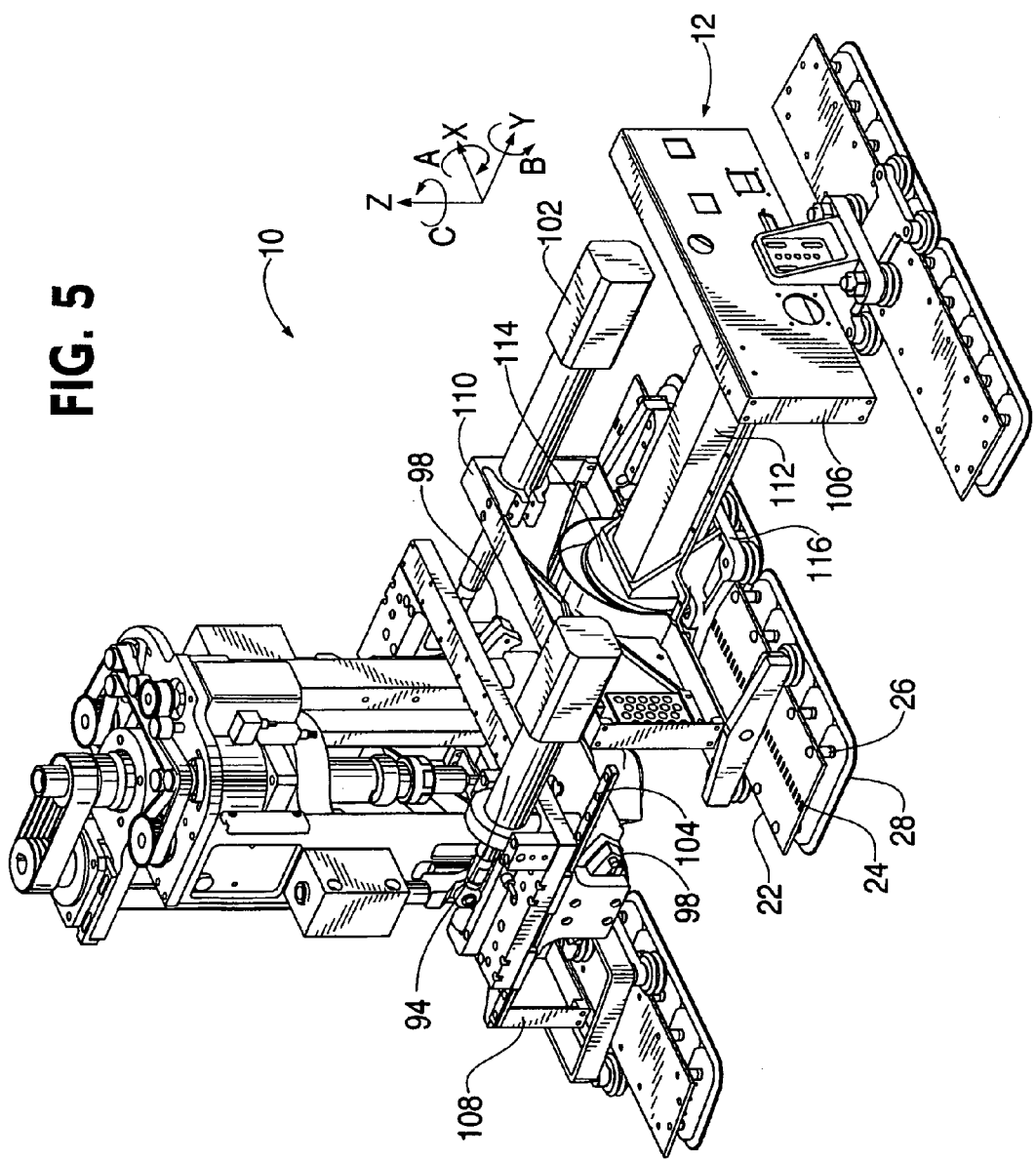
FIG. 5 is a perspective view of the flexible rail machine tool from the viewpoint of FIG. 3, with some additional frame elements omitted and all rails included.

FIG. 5 is a perspective view showing key elements in their operation orientation. In this view, the transverse (Y-axis) actuator 102 and one of the transverse rails 104 may be seen, along with parts of the two arced rails 98 and the associated tilt actuator 94. The transverse rail 104 is attached to the toolhead 12 frame, the end units 106 and 108 and intermediate unit 110 of which are visible in part in this view.

FIG. 5 also shows more detail of the primary rail 22 with its rack 24, spacing pins 26, and vacuum cups 28. A drive mechanism, which includes a motor and may, depending on embodiment details, include a gear reducer, an encoder, and motor drive electronics, is shown housed in a longitudinal drive housing 112. A pinion gear is enclosed within a pinion gear shroud 114. The drive housing 112 and pinion gear shroud 114 form an integrated assembly with a second primary rail roller support arm 116.

Figure 6:
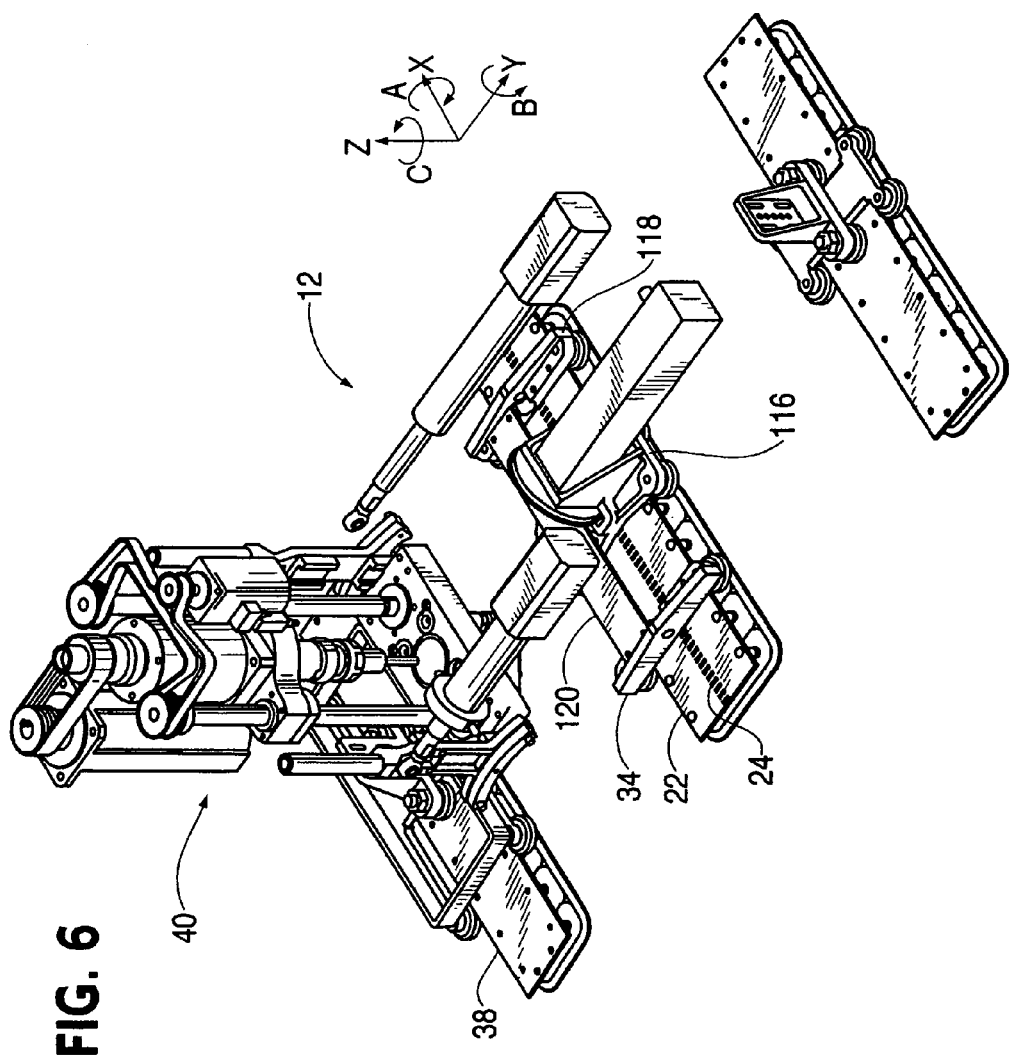
FIG. 6 is an end view of the flexible rail machine tool in FIG. 1, with structural devices and housings omitted.

FIG. 6 presents substantially the same view as FIG. 5 with more mounting apparatus omitted. In this view, the first primary rail roller support arm 34 and the second primary rail roller support arm 116, as well as the third primary rail roller support arm 118, may be seen, along with the primary rail drive coupling spring 120 that ties the three arms 34, 116, and 118 together. As noted, the first primary rail roller support arm 34 is coupled to the first side frame member 30 by a pivot 36; an equivalent pivot can be used to support the third primary rail roller support arm 118. These two arms can carry the weight of the toolhead 12, while the second primary rail roller support arm 116 couples the longitudinal axis force from the X-axis drive mechanism to the primary rail 22.

A pitch plane of a rack—corresponding to the pitch line of a planar projection of a circular gear—is the effective plane through which the drive pinion acts in coupling motion between the two components of a rack and pinion. The neutral plane of a flexing object with thickness is a surface, ordinarily within the object, that does not change dimension in a direction of interest during flexure. This may, for example, be the midplane of a flexible slab formed of a material that is substantially uniform in composition in the direction of interest.

With proper fabrication, the pitch plane of the machined rack 24 may preferably lie on the neutral plane of the primary rail 22. As a result, primary rail 22 flexure to conform to workpiece 14 (see FIG. 1) curvature can leave the length of the driven axis substantially unchanged, substantially eliminating this error term from position computations. Thus correlation between the angular position of the pinion gear and longitudinal position of the toolhead 12 on the workpiece 14 may be based on the known surface length of the workpiece 14 without a curvature correction.

Torsional limberness in the coupling spring 120 allows twist in the workpiece 14 to be accommodated through twist in the primary rail 22 with minimal torsional loading error on the end effector 40. Since the primary rail 22 is used as a dimensional reference, the second rail 38 can conform to a portion of the workpiece surface that differs appreciably in orientation, with the reaction function of the second rail 38 substantially unaffected.

Alternative embodiments of coupling spring 120 are possible, including for example cables in tension, rods, and a cross-slot in the frame that couples to the second support arm 116. Each such embodiment allows the X-axis force from the pinion to be coupled to the toolhead 12.

Figure 7:
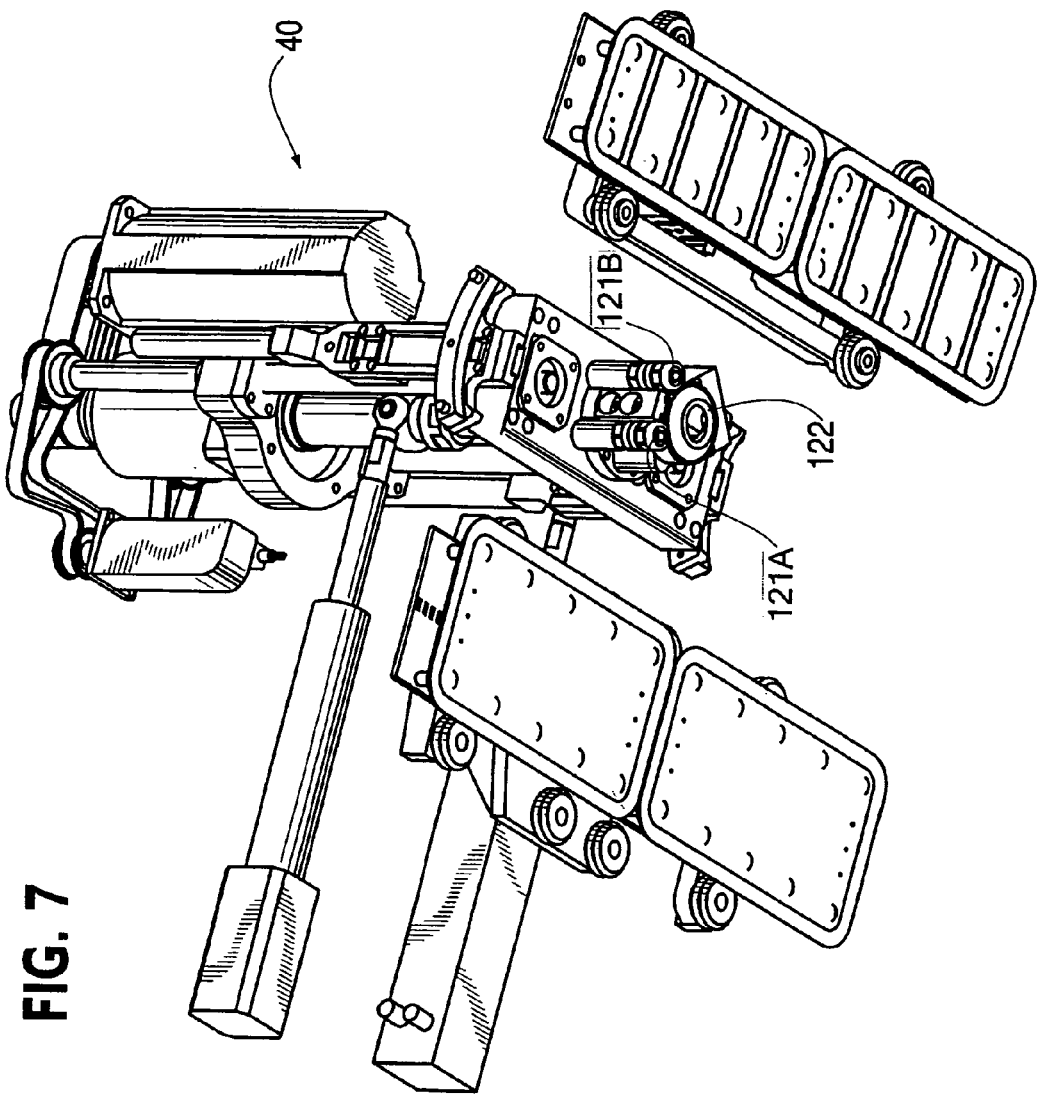
FIG. 7 is a perspective view from below the flexible rail machine tool of FIG. 1.

FIG. 7 is a bottom view of a preferred embodiment of the flexible rail machine tool, in which again both the spanned and cantilevered rails are shown. In this view, first and second normalizing sensors 121A and 121B, respectively, are shown along with an end effector preload mechanism 122. The normalizing sensors 121A and 121B can be used to detect whether the end effector spindle 76 (see FIG. 3) is oriented normal to the workpiece within an acceptable tolerance range. Assuming that workpiece 14 surfaces are curved essentially uniformly over a range such as the span between the two normalizing sensor 121A and 121B, having the displacement of the two sensors 121A and 121B approximately equal implies that they are meeting the workpiece 14 surface on either side of a point approximately normal to the end effector spindle 76 axis. This assumption is generally valid over a wide range of surfaces to be worked with machine tools. In use, a processor can accept measurements from the two sensors 121A and 121B and generate a correction function, directing the tilt (A-axis) actuator 94 (see FIG. 4) to adjust the end effector 40 angle for normality, that is, perpendicularity, to the workpiece. Y-axis compensation may be required to assure that holes are placed at the desired locations including the normality compensation; this correction can be incorporated into a position control processor algorithm.

A second axis of normality can be detected by adding another pair of sensors to measure B-axis error. With suitable transducer placement, one of the B-axis sensors can be sensor 121A or sensor 121B, with its measurement used a second time. Adding B-axis motion may require an additional bearing system and actuator.

The preload mechanism 122 can apply an initial force to the workpiece approximately equal to a total force to be applied during a machine process such as drilling. As tool force is subsequently applied, the preload 122 can be adjusted to keep the total force substantially constant throughout the tool cycle.

Figure 8:
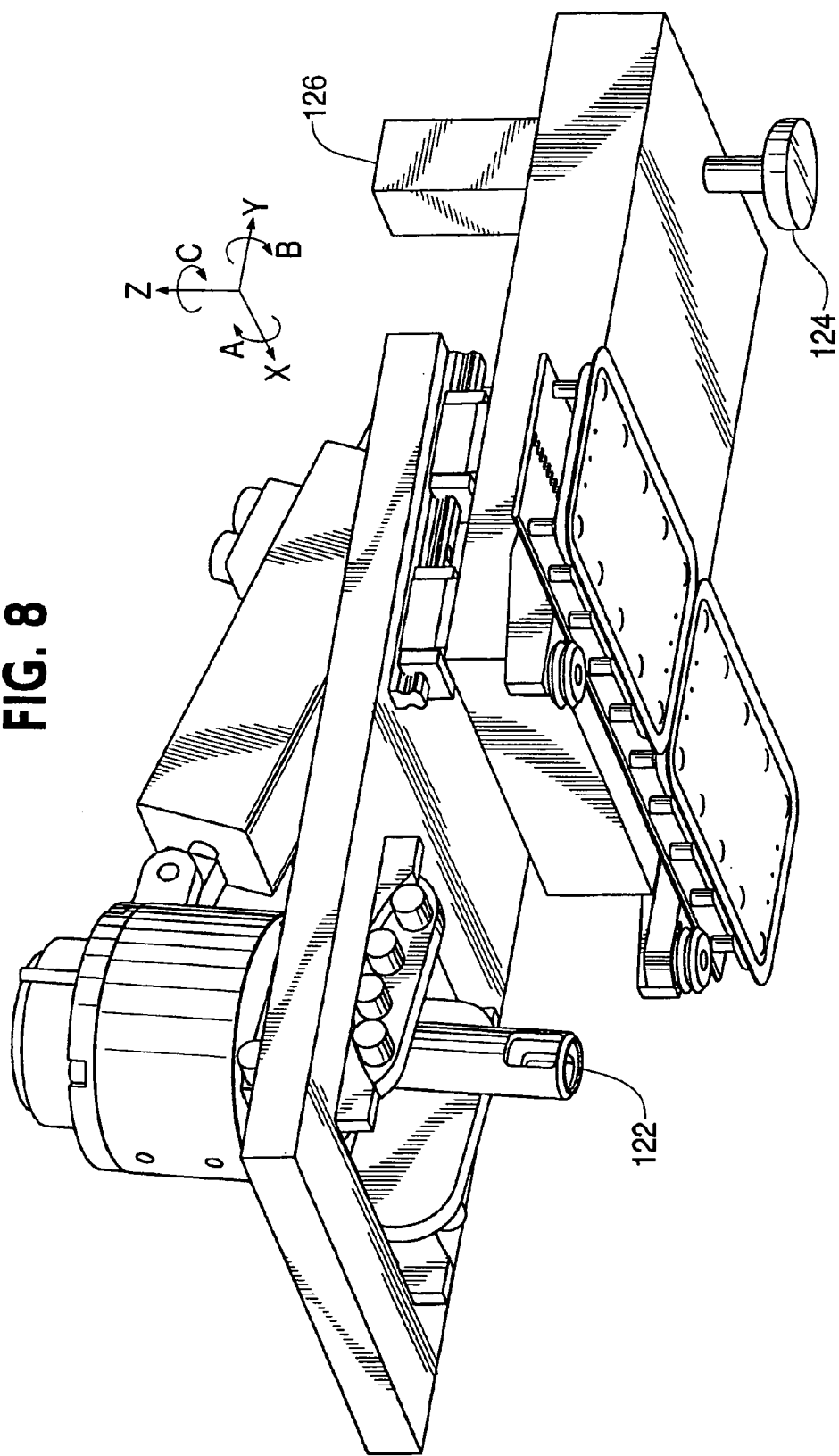
FIG. 8 is a perspective view showing a reaction foot used in place of a second rail in accordance with an alternate embodiment of the invention.
Figure 9:
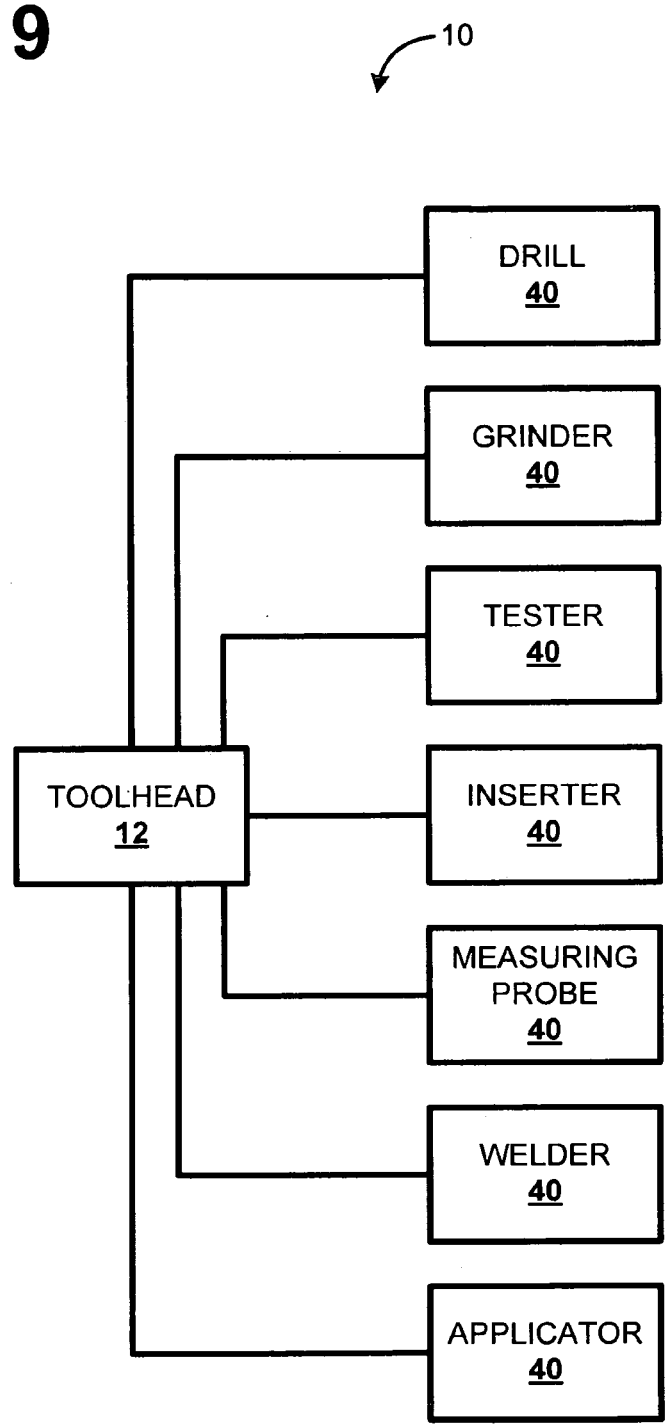
FIG. 9 is a block diagram of the flexible rail machine tool with a variety of end effectors suitable for use with embodiments of the invention.

FIG. 8 is a perspective view of another embodiment showing a reaction foot 124 with a pneumatic actuator 126 to counter the force applied by the preload mechanism 122 during tool actuation. Although an embodiment of the flexible rail machine tool 10 is shown in FIGS. 1–7 using rail configurations with at least two sets of vacuum cups, it will be appreciated that it is likewise feasible either to use a reaction foot 124 attached to the toolhead 12 in place of a second rail or to use a second rail without vacuum cups to function as a nontranslating reaction element.

Although the flexible rail machine tool 10 is useful for aerospace manufacturing, it will be appreciated that it can also be used for manufacturing and construction in shipbuilding, civil engineering, and other industries. Likewise, the size of the tool disclosed herein is appropriate for aerospace manufacturing, but it will be appreciated that far larger tools may be appropriate for larger construction projects, while very small tools achieving proportional precision and autonomous operation may be desirable for miniature applications. Operation in hostile environments such as under water may similarly be a desirable feature of other embodiments of the invention. Attachment of the apparatus in space or other hard-vacuum environments and to rough or porous surfaces, as well as in other environments not suitable for vacuum use, may require recourse to mechanical clamps or fasteners, or to magnetic or eddy-current coupling devices.

The toolhead in the exemplary embodiment is shown configured as a drill. Adaptation of this toolhead to other functions is possible. For example, a drill with multiple bits can include automatic change of bits, whether to drill a variety of sizes of holes or to use several bits for a specified number of holes each, setting aside worn bits until resharpened or discarded. Similarly, tools may include, for example, gauges, fastener inserters, grinders, welders, adhesive applicators, heaters, curing lamps, pressure pads, ultrasonic testers, and any other tools that may be suitable for automated or remotely controlled use.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A flexible rail machine tool for performing operations on a workpiece, comprising:
　a flexible primary rail coupled to the workpiece, wherein said primary rail further comprises:
　　a first multiplicity of spacing pins attached to said primary rail, wherein said spacing pins make contact with the workpiece and thereby establish a set distance between said primary rail and the workpiece at a first multiplicity of points;
　　a first multiplicity of vacuum cups attached to said first multiplicity of spacing pins, whereby, under application of vacuum, said spacing pins are releasably drawn into contact with the workpiece and said primary rail is substantially immobilized with respect to the workpiece;
　a vacuum source; and
　　an interconnection path between said vacuum source and said first multiplicity of vacuum cups;
　a flexible second rail coupled to the workpiece, the second rail being approximately parallel to the primary rail, wherein said flexible second rail further comprises:
　　a second multiplicity of spacing pins attached to said second rail, wherein said spacing pins make contact with the workpiece and thereby establish a set distance between said second rail and the workpiece at a second multiplicity of points;
　　a second multiplicity of vacuum cups attached to said second multiplicity of spacing pins, whereby, under application of vacuum, said spacing pins are releasably drawn into contact with the workpiece and said second rail is substantially immobilized with respect to the workpiece; an interconnection path between said vacuum source and said second multiplicity of vacuum cups;
　a toolhead moveably coupled to said primary rail and to said second rail, the toolhead being moveable in a longitudinal direction along the primary and second rails, wherein the toolhead is supported as a cantilever extending laterally beyond the primary rail opposite the second rail; and
　an end effector on said toolhead, wherein said end effector is a mechanism that performs a machine tool function.

2. The flexible rail machine tool of claim 1, wherein said end effector is located proximal to a first maximum lateral extent of said toolhead and distal to a second maximal lateral extent of said toolhead.

3. The flexible rail machine tool of claim 1, wherein said primary rail further comprises a gear tooth rack incised into said primary rail.

4. The flexible rail machine tool of claim 3, wherein said gear tooth rack further comprises a pitch plane substantially coincident with a neutral plane of flexure of said primary rail.

5. The flexible rail machine tool of claim 1, further comprising:
　a first support mechanism attaching and supporting said toolhead with respect to said primary rail, wherein said first support mechanism is situated between a first maximum lateral extent of said toolhead and a second maximum lateral extent of said toolhead; and
　a second support mechanism attaching and supporting said toolhead with respect to said second rail.

6. The flexible rail machine tool of claim 5, wherein said first support mechanism is situated generally midway between the first lateral extent of said toolhead and the second lateral extent of said toolhead.

7. The flexible rail machine tool of claim 5, wherein said second support mechanism connects to said toolhead at the first maximum lateral extent of said toolhead.

8. The flexible rail machine tool of claim 5, wherein said second support mechanism connects to said toolhead at the second maximum lateral extent of said toolhead.

9. The flexible rail machine tool of claim 5, wherein said primary rail further comprises:
　a first male vee groove comprising a first maximum transverse extent of said primary rail, wherein said first male vee groove is generally straight and uniform throughout the extent of said primary rail; and
　a second male vee groove comprising a second maximum transverse extent of said primary rail, wherein said second male vee groove is generally parallel to said first male vee groove.

10. The flexible rail machine tool of claim 9, wherein said first support mechanism further comprises:
　a first support roller having a first circumferential female vee groove that bears against said first male vee groove of said primary rail;
　a second support roller having a second circumferential female vee groove that bears against said second male vee groove of said primary rail; and
　a first support arm whereby said first support roller and said second support roller are held in substantially fixed relationship to each other.

11. The flexible rail machine tool of claim 10, wherein said first support mechanism further comprises a pivot whereby said first support arm attaches to said toolhead.

12. The flexible rail machine tool of claim 10, wherein said second support mechanism further comprises:
　a third male vee groove comprising a first maximum transverse extent of said second rail, wherein said third male vee groove is generally straight and uniform throughout the extent of said second rail; and
　a fourth male vee groove comprising a second maximum transverse extent of said second rail, wherein said fourth male vee groove is generally parallel to said third male vee groove;
　a third support roller having a third circumferential female vee groove that bears against said third male vee groove of said second rail;
　a fourth support roller having a fourth circumferential female vee groove that bears against said fourth male vee groove of said second rail; and
　a second support arm whereby said third support roller and said fourth support roller are coupled to the toolhead.

13. The flexible rail machine tool of claim 12, wherein said second support mechanism further comprises:
　a transverse support rail moveably coupled to said second rail and to said second support arm, wherein said transverse support rail further comprises:
　　a first transverse male vee groove comprising a local forward extent of said transverse support rail, and
　　a second transverse male vee groove parallel to said first transverse male vee groove and comprising a local aft extent of said transverse support rail;
　a fifth support roller having a fifth circumferential female vee groove coupled to said second support arm that bears against said first transverse male vee groove of said transverse support rail;
　a sixth support roller having a sixth circumferential female vee groove coupled to said second support arm that bears against said second transverse male vee groove of said transverse support rail;

a mounting bracket whereby said fifth support roller and said sixth support roller are held in fixed relationship to each other; and a coupling fitting whereby said mounting bracket attaches to said toolhead.

14. The flexible rail machine tool of claim 13, wherein said coupling fitting further comprises a hole pattern whereby said coupling fitting can be attached to said toolhead at a multiplicity of heights.

15. The flexible rail machine tool of claim 13, wherein said transverse support rail substantially spans the width of the second rail.

16. The flexible rail machine tool of claim 13, wherein said third and fourth support rollers are rotatably attached to said transverse support rail.

17. The flexible rail machine tool of claim 12, wherein said third and fourth support rollers are rotatably attached to said second support arm.

18. The flexible rail machine tool of claim 1, wherein the primary and second rails are further releasably coupled to the workpiece.

19. The flexible rail machine tool of claim 1, wherein the widths of the rails extend substantially parallel to the surface of the workpiece, each rail bending and twisting to substantially conform to a contoured surface of the workpiece.

20. The flexible rail machine tool of claim 1, further comprising a drive device coupled to the toolhead and to the primary rail to drive the toolhead along the primary rail.

21. The flexible rail machine tool of claim 20, further comprising a drive member coupled to the drive device to engage a gear tooth rack incised into said primary rail parallel to a longitudinal axis of the primary rail.

22. The flexible rail machine tool of claim 1, wherein the toolhead further comprises at least one transverse rail upon which the end effector is mounted to provide for motion of the end effector in a lateral direction with respect to the primary and second rails.

23. The flexible rail machine tool of claim 22, further comprising an actuator coupled to the toolhead and to the end effector to actuate the end effector in the lateral direction.

24. The flexible rail machine tool of claim 1, wherein the end effector comprises a drill device.

25. The flexible rail machine of claim 1, wherein said end effector comprises one of a drill, grinder, tester, inserter, measuring probe, welder, and an applicator.

* * * * *